(12) United States Patent
Osakabe (10) Patent No.: US 9,606,776 B2
(45) Date of Patent: Mar. 28, 2017

(54) PROGRAMMING DEVICE

(71) Applicant: Mitsubishi Electric Corporation, Tokyo (JP)

(72) Inventor: Yusuke Osakabe, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/902,603

(22) PCT Filed: Mar. 7, 2014

(86) PCT No.: PCT/JP2014/056050
§ 371 (c)(1),
(2) Date: Jan. 4, 2016

(87) PCT Pub. No.: WO2015/132971
PCT Pub. Date: Sep. 11, 2015

(65) Prior Publication Data
US 2016/0196113 A1 Jul. 7, 2016

(51) Int. Cl.
*G06F 9/44* (2006.01)
*G06F 9/45* (2006.01)
(Continued)

(52) U.S. Cl.
CPC .............. *G06F 8/311* (2013.01); *G05B 19/05* (2013.01); *G05B 19/056* (2013.01); *G06F 8/34* (2013.01); *G05B 2219/13146* (2013.01)

(58) Field of Classification Search
CPC G05B 19/056; G05B 19/0426; G05B 19/054; G05B 2219/13129;
(Continued)

(56) References Cited

U.S. PATENT DOCUMENTS 6,366,300 B1 * 4/2002 Ohara ................... G05B 19/056
700/83
7,257,620 B2 * 8/2007 Lo ....................... G05B 19/0426
709/203

(Continued)

FOREIGN PATENT DOCUMENTS

DE 10197097 T5 4/2004
DE 60035202 T2 2/2008
(Continued)

OTHER PUBLICATIONS

Kumar et al., Source code metrics for programmable logic controller (PLC) ladder diagram (LD) visual programming language, May 2016, 7 pages.*

(Continued)

*Primary Examiner* — Thuy Dao
(74) *Attorney, Agent, or Firm* — Sughrue Mion, PLLC; Richard C. Turner (57) ABSTRACT

A programming device creating a program in FBD language describing processes by connecting FBD parts on an editor screen, includes: a part information managing unit managing size information indicating a size of an FBD part; a recommended order determining unit acquiring, when operation to newly arrange an FBD part relative to an already-arranged FBD part on the editor screen is performed, size information on the already-arranged FBD part and size information on the FBD part to be newly arranged, from the part information managing unit, detecting regions where the FBD part to be newly arranged can be arranged based on the acquired size information, and determining a recommended priority order of part arrangement among the regions based on positions of the detected regions; and an editor unit displaying the recommended priority order determined by the recommended order determining unit in the regions.

6 Claims, 6 Drawing Sheets

(51) Int. Cl.
*G06F 15/16* (2006.01)
*G05B 19/05* (2006.01)

(58) Field of Classification Search
CPC . G05B 2219/13144; G06F 8/20; G06F 8/311;
G06F 8/33
See application file for complete search history.

(56) References Cited

U.S. PATENT DOCUMENTS

| | | | | |
|---|---|---|---|---|
| 7,324,856 | B1* | 1/2008 | Bromley | G05B 19/056 700/86 |
| 7,603,183 | B1* | 10/2009 | Munemoto | G05B 19/05 700/17 |
| 8,086,664 | B2* | 12/2011 | Lo | G05B 19/056 700/83 |
| 8,117,424 | B2* | 2/2012 | Boggs | G05B 19/056 712/223 |
| 8,327,316 | B2* | 12/2012 | Chouinard | G05B 19/056 717/100 |
| 8,694,959 | B2* | 4/2014 | Chouinard | G05B 19/0426 717/106 |
| 2001/0045965 | A1 | 11/2001 | Orbanes et al. | |
| 2001/0052110 | A1 | 12/2001 | Orbanes et al. | |
| 2002/0069215 | A1 | 6/2002 | Orbanes et al. | |
| 2002/0075311 | A1 | 6/2002 | Orbanes et al. | |
| 2002/0075331 | A1 | 6/2002 | Orbanes et al. | |
| 2002/0080177 | A1 | 6/2002 | Orbanes et al. | |
| 2002/0083034 | A1 | 6/2002 | Orbanes et al. | |
| 2002/0085035 | A1 | 7/2002 | Orbanes et al. | |
| 2002/0089541 | A1 | 7/2002 | Orbanes et al. | |
| 2002/0089550 | A1 | 7/2002 | Orbanes et al. | |
| 2002/0105537 | A1 | 8/2002 | Orbanes et al. | |
| 2002/0109680 | A1 | 8/2002 | Orbanes et al. | |
| 2005/0102651 | A1 | 5/2005 | Ueda | |
| 2005/0266712 | A1 | 12/2005 | Miyamoto et al. | |
| 2009/0024230 | A1 | 1/2009 | Hioka et al. | |
| 2015/0248122 | A1* | 9/2015 | Norwood | G06Q 30/0621 700/87 |

FOREIGN PATENT DOCUMENTS

| | | |
|---|---|---|
| JP | 4-40502 A | 2/1992 |
| JP | 2003-529825 A | 10/2003 |
| JP | 2005-339143 A | 12/2005 |
| JP | 2008-310390 A | 12/2008 |
| JP | 2010-277506 A | 12/2010 |
| JP | 2012159868 A | 8/2012 |
| WO | 02/079886 A1 | 10/2002 |

OTHER PUBLICATIONS

International Search Report for PCT/JP2014/056050 dated May 13, 2014.

Communication dated Oct. 31, 2016, issued by the German Patent Office in counterpart German Application No. 112014003151.8.

* cited by examiner

PROGRAMMING DEVICE

CROSS REFERENCE TO RELATED APPLICATIONS

This application is a National Stage of International Application No. PCT/JP2014/056050 filed Mar. 7, 2014, the contents of which are incorporated herein by reference in their entirety.

FIELD

The present invention relates to a programming device that creates a program by using an FBD (Function Block Diagram) language.

BACKGROUND

Conventionally, a programmable logic controller (PLC) is used to sequentially control control-object apparatuses in manufacturing lines or individual devices in a factory or at sites such as plants and office buildings. In programming therefor, an FBD language, which is a programming language for the programmable logic controller defined as standard IEC61131-3 by the International Electrotechnical Commission (IEC), is used.

The program in FBD language describes a series of processes by arranging and connecting FBD parts such as a function or a function block. Each FBD part includes input terminals on the left side and output terminals on the right side, and FBD parts are connected via the input terminals and the output terminals.

In the connections of the FBD language, one connection line can be separated into a plurality of connections and a terminal can be made unconnected. Further, as a case in which a compilation error occurs in a created program, there are, for example, cases where data types of a source terminal and a destination terminal being connected are different and where a terminal that is required to be connected has not been connected.

Patent Literature 1 discloses an invention in which, when a connection is supplied to a designated part, all of the unconnected terminals are automatically connected to the terminals of a nearby FBD part from the topmost portion.

CITATION LIST

Patent Literature

Patent Literature 1: Japanese Patent Application Laid-Open No. 2005-339143

SUMMARY

Technical Problem

In the programming in FBD language, when FBD parts are arranged, the user determines the arranging positions of the FBD parts by taking the positions of the already-arranged FBD parts into consideration among numerous arranging positions; therefore, time is required for determining the arranging positions of the FBD parts and thus time is required for the programming.

Further, in a case of selecting a source terminal in a connection, because all the terminals are displayed uniformly, a terminal with a high connection priority cannot be easily recognized, and moreover, a terminal that causes a compilation error is hard to recognize. Therefore, time is required for the programming.

Further, in a case of selecting a destination terminal in a connection, because all the terminals are displayed uniformly, a terminal with a high connection priority cannot be easily recognized, and moreover, a terminal that does not cause a compilation error is hard to recognize. Therefore, time is required for the programming.

The invention disclosed in Patent Literature 1 cannot separate one connection line into plural connection lines, make a terminal be unconnected, and perform connection by taking the compilation error into consideration.

The present invention has been achieved in view of the above, and an object of the present invention is to obtain a programming device that can shorten the time required for the programming in FBD language.

Solution to Problem

In order to solve the above problems and achieve the object, an aspect of the present invention is a programming device that creates a program in FBD language that describes processes by connecting a plurality of FBD parts on an editor screen, the programming device including: a part information managing unit that manages size information indicating a size of an FBD part; a recommended order determining unit that acquires, when an operation to newly arrange an FBD part relative to an already-arranged FBD part on the editor screen is performed, size information on the already-arranged FBD part and size information on the FBD part to be newly arranged, from the part information managing unit, detects a plurality of regions where the FBD part to be newly arranged is capable of being arranged on a basis of the acquired size information, and determines a recommended priority order of part arrangement among the plurality of regions on a basis of positions of the detected regions; and an editor unit that displays the recommended priority order determined by the recommended order determining unit in the regions.

Advantageous Effects of Invention

The programming device according to the present invention detects regions where the FBD part to be arranged next can be arranged and determines and displays the recommended order for each of the detected regions; therefore, an effect is obtained where it becomes easy to determine the arranging positions of the FBD parts in a short period of time.

DESCRIPTION OF EMBODIMENTS

Exemplary embodiments of a programming device according to the present invention will be explained below in detail with reference to the drawings. The present invention is not limited to the embodiments.

First Embodiment

Figure 1:
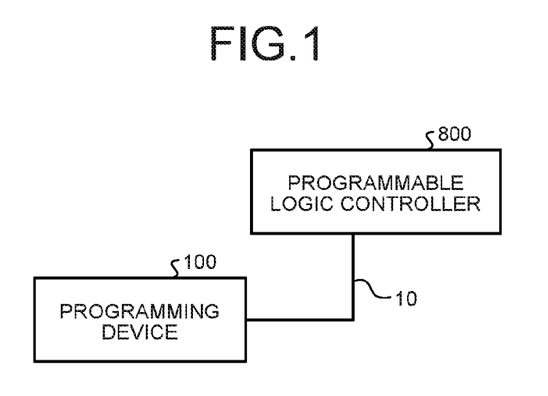
FIG. 1 is a diagram illustrating the state of use of a programming device according to a first embodiment of the present invention.

FIG. 1 is a diagram illustrating the state of use of a programming device according to a first embodiment of the present invention. A programming device 100 is a device that displays an editor screen and is used for the user to describe a program in FBD language on the editor screen by receiving an operation of arranging FBD parts on the editor screen and an operation of connecting the FBD parts together on the editor screen. The programming device 100, which when in use, is connected to a programmable logic controller 800 via a transmission path 10.

Figure 2:
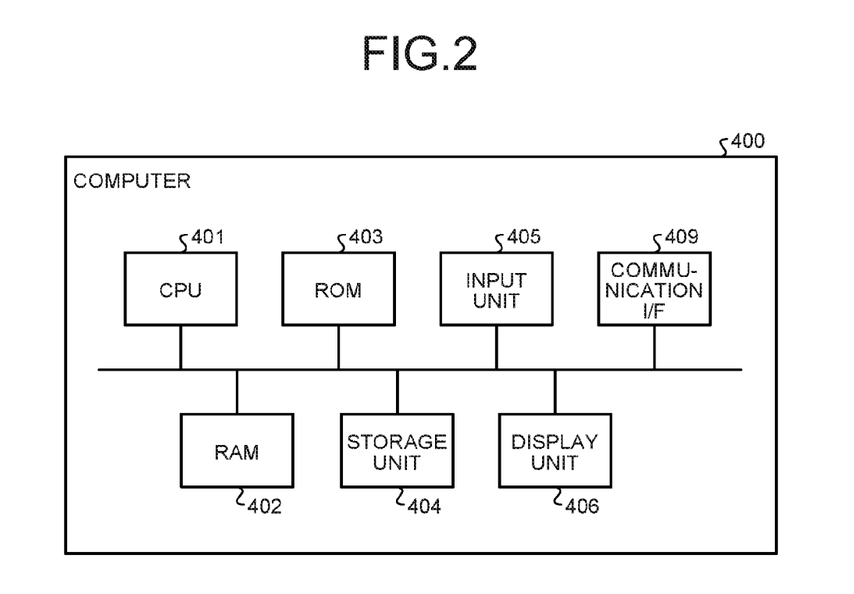
FIG. 2 is a diagram illustrating a hardware configuration of a computer that executes programming tool software.

The programming device 100 is configured by installing programming tool software on a general-purpose computer. FIG. 2 is a diagram illustrating a hardware configuration of the computer that executes the programming tool software. A computer 400 includes a CPU (Central Processing Unit) 401, a RAM (Random Access Memory) 402, a ROM (Read Only Memory) 403, a storage unit 404, an input unit 405, a display unit 406, and a communication I/F (Interface) 409.

The CPU 401 is a computing device that executes the programming tool software. The RAM 402 is a work area to be used when the CPU 401 executes the program. The ROM 403 stores, in a nonvolatile manner, a program executed by the CPU 401 when the computer 400 is activated (more specifically, Initial Program Loader (IPL), etc.). The storage unit 404 is a device that stores information in a nonvolatile manner, and a HDD (Hard Disk Drive), a SSD (Solid State Drive), and the like can be used as the storage unit 404. The input unit 405 is an interface for the operator to input information, and a pointing device (mouse, touch panel, etc.), a keyboard, and the like can be used as the input unit 405. The display unit 406 is a device that displays information, and a LCD (Liquid Crystal Display), an OLED (Organic Light Emitting Display), and the like can be used as the display unit 406. The communication I/F 409 is an interface for communicating with the programmable logic controller 800 via the transmission path 10.

Figure 3:
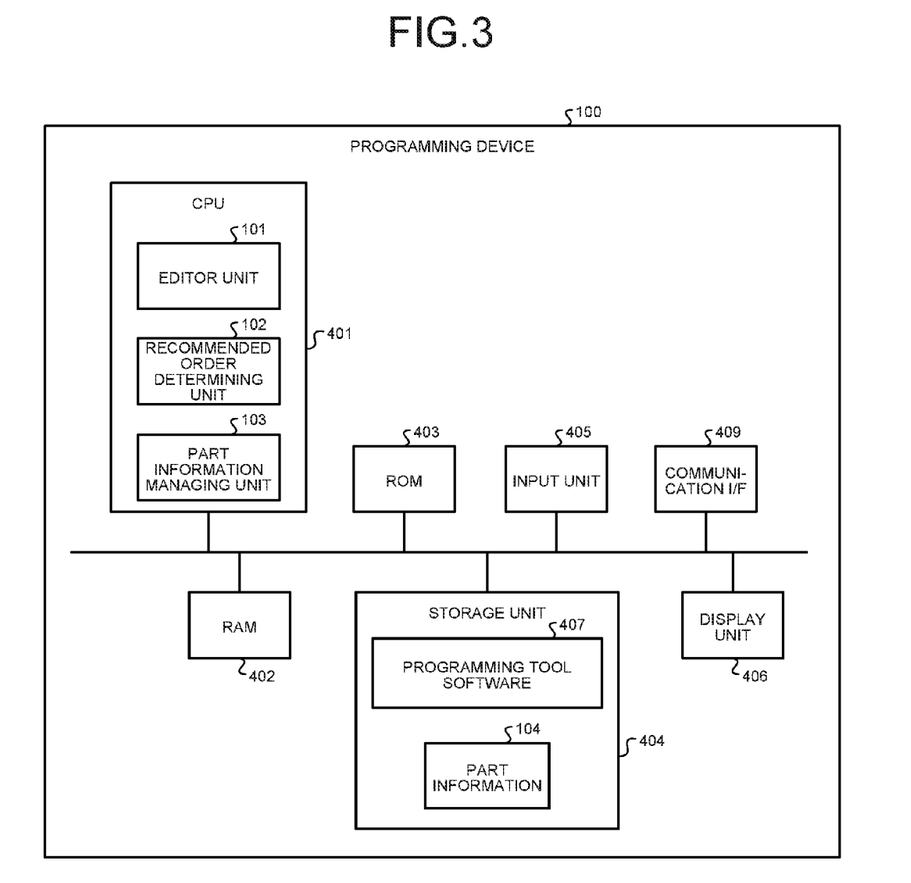
FIG. 3 is a diagram illustrating the computer functioning as a programming device.

The programming tool software that has been installed on the computer 400 is stored in the storage unit 404. The CPU 401 reads and executes programming tool software 407 stored in the storage unit 404, whereby the computer 400 functions as the programming device 100. FIG. 3 is a diagram illustrating the computer functioning as the programming device. The programming device 100 includes an editor unit 101, a recommended order determining unit 102, and a part information managing unit 103, which are formed on the CPU 401.

Further, when the programming tool software 407 is installed, part information 104, which is used by the programming tool software 407, is stored in the storage unit 404. The part information 104 is part characteristic information related to each of the FBD parts, and includes information related to the size of the FBD parts on the editor screen (hereafter denoted as part size information).

When an FBD part is arranged, the recommended order determining unit 102 searches for a region where the part can be arranged on the editor screen. When there is a region where the part can be arranged, the recommended order determining unit 102 displays a recommended order. The recommended order will be described later.

The part information managing unit 103 reads the part information 104 from the storage unit 404 according to the request from the recommended order determining unit 102. The part information managing unit 103 retains information on the types and positions of parts regarding the FBD parts already arranged on the editor screen. The information on the positions of parts specifically is coordinate values on the editor screen.

The editor unit 101 causes the display unit 406 to display the editor screen and performs a process to create and edit a sequence program according to the operation by the operator performed on the input unit 405. The functions of the editor unit 101 are similar to the editor functions of a general programming device. The editor unit 101 references the information on the types and positions of the parts that the part information managing unit 103 retains and displays the FBD parts on the editor screen.

Figure 4:
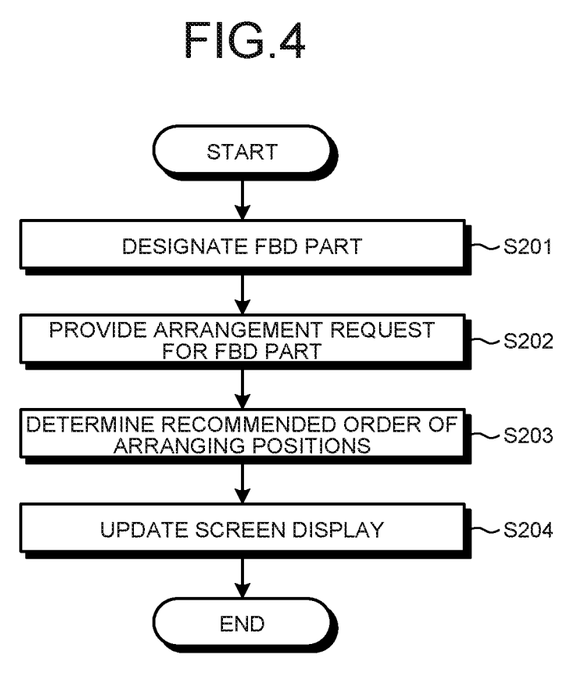
FIG. 4 is a flowchart illustrating the operation flow of the programming device according to the first embodiment.

FIG. 4 is a flowchart illustrating the operation flow of the programming device according to the first embodiment. When a program is created using FBD parts, the user operates the input unit 405 to designate an FBD part that has already been arranged on the editor screen (step S201). Next, the user operates the input unit 405 to provide a request to arrange an FBD part on the editor screen to the editor unit 101 (step S202).

The editor unit 101 that has received the request to arrange the FBD part on the editor screen requests the recommended order determining unit 102 to search for a location where the FBD part is to be arranged. The recommended order determining unit 102 that has received the request from the editor unit 101 requests part size information on the already-arranged FBD part, the designated FBD part, and the FBD part to be arranged (hereinafter denoted as an arrange-target FBD part) from the part information managing unit 103. The part information managing unit 103 reads, from the part information 104, the part size information on the respective FBD parts requested by the recommended order determining unit 102 and returns the same to the recommended order determining unit 102. Further, the recommended order determining unit 102 acquires the arranging position information on the already-arranged FBD part and the designated FBD part from the editor unit 101. The recommended order determining unit 102 detects a region that is located at a certain distance from the designated FBD part and where the arrange-target FBD part can be arranged without overlapping the already-arranged FBD part according to a preset algorithm and on the basis of the part size information and the arranging position information. Further, the recommended order determining unit 102 detects the topmost part coordinates of the detected region. In a case where a plurality of regions is detected, the recommended order determining unit 102 determines the recommended order for each detected region according to a preset algorithm (step S203).

The certain distance from the designated FBD part may be changeable by the user or may be a preset fixed value.

The recommended order determining unit 102 sends the determined recommended order and the topmost part coordinates of each region to the editor unit 101. The editor unit 101 provides a recommended order display section at the topmost part of each region and updates the screen display such that respective items of, for example, a number string or a character string indicating the order corresponding to the recommended order determined by the recommended order determining unit 102 are displayed on the editor screen (step S204). Examples of the number string or character string indicating the order corresponding to the recommended order include an arithmetic progression where the first term is 1 and the common difference is 1, which is in other words a sequence of natural numbers. In this case, the recommended order is displayed on the editor screen by natural numbers starting from "1". As another example of the number string or character string indicating the order corresponding to the recommended order, an alphabetical letter string such as A, B, C, D, . . . may be exemplified. Further, other than a simple number sequence or character string, respective items of a number sequence or a character string representing an overall order and a detailed order therewithin may be displayed in the recommended order display sections. For example, if a numerical sequence such as 1.1, 1.2, 2.1, 2.2, 2.3, 2.4 is used, the order on the whole can be represented by the value of ones and the detailed order can be represented by the value of tenths.

The operation of the programming device 100 of the first embodiment will be described with reference to a specific example. The program in FBD language is generally described such that the process progresses from top to bottom and left to right; and an operation to newly arrange an FBD part on the upper side of an already-arranged FBD part is not generally performed. Due to this, an example herein will be of a case where the algorithm of the recommended order determining unit 102 is set such that it detects a region where the arrange-target FBD part can be arranged only on the right side, left side, and lower side of the designated FBD part. Further, in view of the process flow from top to bottom and left to right, the algorithm of the recommended order determining unit 102 is set such that it determines the recommended order for each of the detected regions with higher priority in the order of the right side, the left side, and the lower side. Due to this, the recommended order determining unit 102 detects, from the editor screen, the regions where the arrange-target FBD part can be arranged on the right side, the left side, and the lower side of the designated FBD part and determines the recommended order indicating the priority degree of the part arrangement in the order of the right side, the left side, and the lower side for each of the detected regions according to the preset algorithm.

In this example, the certain distance from the designated FBD part may be the same on the right side, the left side, and the lower side, or the certain distance from the designated FBD part on the lower side may be smaller. This is because the input terminal or the output terminal is arranged on the right side or the left side of the FBD part, the program in FBD language can be seen easily when the left and right spaces are wider than the upper and lower spaces.

Further, the example herein will only detect the region where the arrange-target FBD part can be arranged in the three directions, namely, the left, right, and lower sides; however, the algorithm of the recommended order determining unit 102 may be set such that the region where the arrange-target FBD part can be arranged is detected also for the upper side. In this case, in view of the fact that the operation to newly arrange an FBD part on the upper side of an already-arranged FBD part is not generally performed, the algorithm of the recommended order determining unit 102 can be set such that the priority degree of the region detected from the upper side is the lowest upon determining the recommended order for each region.

Figure 5:
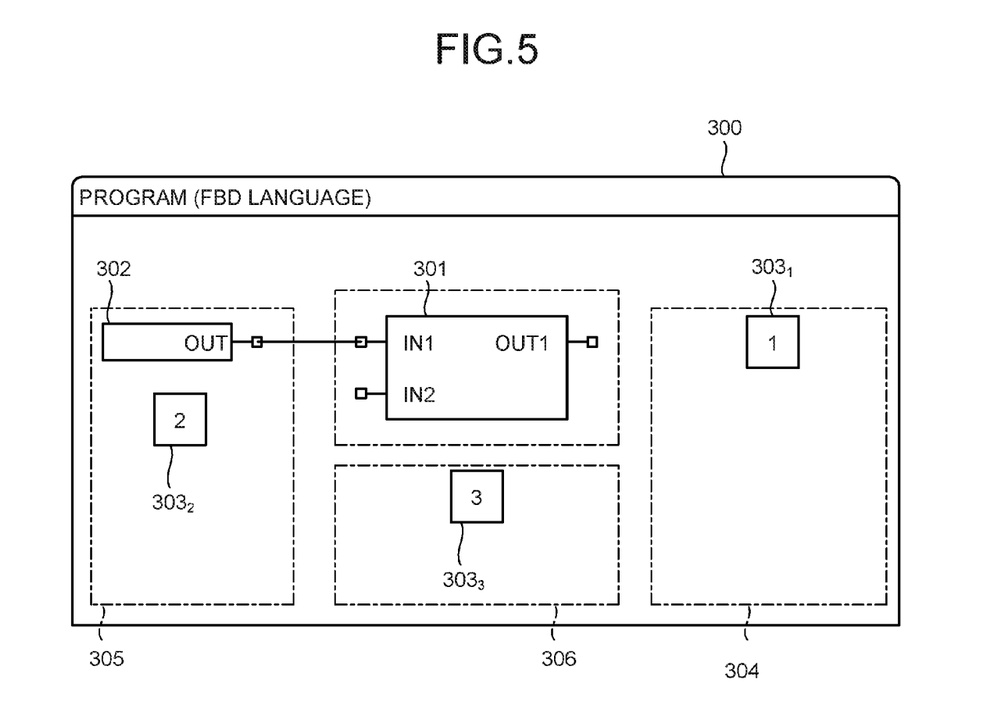
FIG. 5 is a diagram illustrating an example of an editor screen that the programming device according to the first embodiment causes a display unit to display.

FIG. 5 is a diagram illustrating an example of the editor screen that the programming device according to the first embodiment causes the display unit to display. An editor screen 300 displayed on the display unit 406 includes a designated FBD part 301, an already-arranged FBD part 302, and recommended order display sections $303_1$ to $303_3$. In the recommended order display sections $303_1$ to $303_3$, the recommended order determined by the recommended order determining unit 102 is displayed.

In a case of determining the recommended order, the recommended order determining unit 102 detects a region where the arrange-target FBD part can be arranged without overlapping the already-arranged FBD part 302 within an arrangement candidate search range 304, which is located on the right side of the designated FBD part 301 and is a certain distance apart from the designated FBD part 301, and detects the coordinates of the topmost part within the detected region. The recommended order determining unit 102 then detects a region where the arrange-target FBD part can be arranged without overlapping the already-arranged FBD part 302 within an arrangement candidate search range 305, which is located on the left side of the designated FBD part 301, and detects the coordinates of the topmost part within the detected region. Moreover, the recommended order determining unit 102 detects a region where the arrange-target FBD part can be arranged without overlapping the already-arranged FBD part 302 within an arrangement candidate search range 306, which is located on the lower side of the designated FBD part 301, and detects the coordinates of the topmost part within the detected region. The recommended order determining unit 102 then determines the recommended order such that the regions detected in the arrangement candidate search ranges 304 to 306 are numbered in the order of the right side, the left side, and the lower side of the designated FBD part 301. The editor unit 101 arranges recommended order display sections $303_1$ to $303_3$ at the portions of the coordinates of the topmost portions of the respective regions detected in the arrangement candidate search ranges 304 to 306 to display the determined recommended order. Due to this, "1" is displayed in the recommended order display section $303_1$ in the arrangement candidate search range 304, "2" is displayed in the recommended order display section $303_2$ in the arrangement candidate search range 305, and "3" is displayed in the recommended order display section $303_3$ in the arrangement candidate search range 306.

When the input unit 405 is operated to input a number corresponding to the recommended order or to select any of the recommended order display sections $303_1$ to $303_3$, the arrange-target FBD part is arranged in the region corresponding to the input number or the selected one of the recommended order display sections $303_1$ to $303_3$. The operation on the input unit 405 to input a number corresponding to the recommended order or to select any of the recommended order display sections $303_1$ to $303_3$ may vary, such as a selection of the recommended order by a keyboard or a selection by a mouse; however, it is not limited to a specific method.

According to the first embodiment, the user can easily determine the arranging positions of the FBD parts by taking into consideration the positions of the already-arranged FBD parts from among numerous arranging positions. That is, according to the first embodiment, the arranging positions of the FBD parts can be determined within a short period of time.

Second Embodiment

The configuration of a programming device according to a second embodiment of the present invention is similar to that in the first embodiment. However, the part information 104 includes terminal characteristic information (hereafter denoted as terminal information) on terminals of each FBD part, and the part information managing unit 103 manages the terminal information on each FBD part. The terminal information includes information on the connection priority that is set for each terminal on a per FBD part unit basis, in addition to the data type.

Figure 6:
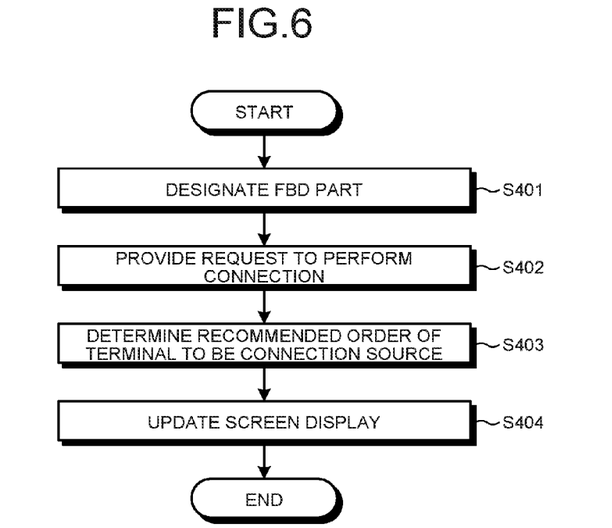
FIG. 6 is a flowchart illustrating the operation flow of a programming device according to a second embodiment.

FIG. 6 is a flowchart illustrating the operation flow of the programming device according to the second embodiment. When a program is created using FBD parts, the user operates the input unit 405 to designate an FBD part that has already been arranged on the editor screen (step S401). Next, the user operates the input unit 405 to provide a request to connect the designated FBD part to the editor unit 101 (step S402). The editor unit 101 that has received the request to connect the designated FBD part requests the recommended order determining unit 102 to extract terminals of the designated FBD part. The recommended order determining unit 102 requests terminal information on the designated FBD part and FBD parts that have already been connected to the designated FBD part from the part information managing unit 103. The part information managing unit 103 reads, from the part information 104, the terminal information requested by the recommended order determining unit 102 and returns the same to the recommended order determining unit 102. On the basis of the terminal information acquired from the part information managing unit 103, the recommended order determining unit 102 extracts terminals that cause a compilation error from the designated FBD part and determines the recommended order according to the connection priority for each terminal as acquired from the part information managing unit 103. Subsequently, the recommended order determining unit 102 extracts the remaining terminals that do not cause a compilation error and determines the recommended order according to the connection priority for each terminal as acquired from the part information managing unit 103 such that the numbers are sequential to the recommended order that has been determined immediately preceding this incident (step S403). As above, the recommended order in the present embodiment indicates a priority of connection work because the terminals that cause a compilation error are given lower numbers and the terminals that do not cause a compilation error are given the numbers sequential to the numbers given to the terminals that cause a compilation error.

The recommended order determining unit 102 sends the determined recommended order to the editor unit 101. The editor unit 101 provides the recommended order display sections such that they correspond to the terminals of the designated FBD part and updates the screen display such that the recommended order determined by the recommended order determining unit 102 is displayed on the editor screen (step S404). That is, the recommended order of natural numbers starting from "1" is displayed on the editor screen.

Figure 7:
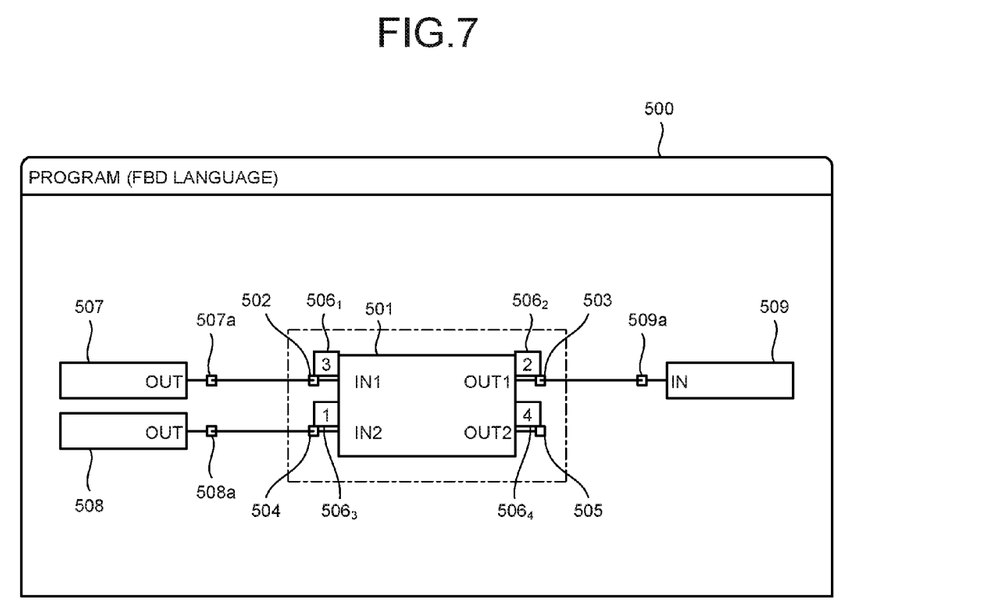
FIG. 7 is a diagram illustrating an example of an editor screen that the programming device according to the second embodiment causes a display unit to display.

An operation of the programming device of the second embodiment will be described with reference to a specific example. FIG. 7 is a diagram illustrating an example of the editor screen that the programming device according to the second embodiment causes a display unit to display. An editor screen 500 displays a designated FBD part 501. The designated FBD part 501 includes two input terminals 502 and 504 and two output terminals 503 and 505. Further, the editor screen 500 displays recommended order display sections $506_1$ to $506_4$. In the recommended order display sections $506_1$ to $506_4$, the recommended order determined by the recommended order determining unit 102 is displayed. Further, the editor screen 500 has FBD parts 507, 508 and 509 that have already been connected to the designated FBD part 501 arranged therein.

Here, it is assumed that the data type of an output terminal 507a of the FBD part 507 matches the data type of the input terminal 502 and thus no compilation error occurs upon connection. Further, it is assumed that the data type of an output terminal 508a of the FBD part 508 is different from that of the input terminal 504 and thus a compilation error occurs upon connection. Moreover, it is assumed that the data type of an input terminal 509a of the FBD part 509 is different from that of the output terminal 503 and thus a compilation error occurs upon connection. It is assumed that the output terminal 505 is not a terminal that needs to be connected to another FBD part and thus it is in a state where no compilation error occurs. Further, it is assumed that, with regard to the connection priority of each terminal of the designated FBD part 501, a higher priority is assigned in the order of the input terminal 502, the output terminal 503, the input terminal 504, and the output terminal 505.

An operation of determining the recommended order performed by the recommended order determining unit 102 will be described. The recommended order determining unit 102 acquires the terminal information on the designated FBD part 501 and the FBD parts 507, 508, and 509 from the part information 104 via the part information managing unit 103. The recommended order determining unit 102 that has acquired the terminal information first extracts the output terminal 503 and the input terminal 504 as the terminals that cause a compilation error. The recommended order determining unit 102 assigns "1" as the recommended order of the output terminal 503 and assigns "2" as the recommended order of the input terminal 504 according to the connection priority set for the output terminal 503 and the input terminal 504. Subsequently, the recommended order determining unit 102 extracts the input terminal 502 and the output terminal 505 as the remaining terminals that do not cause a compilation error. The recommended order determining unit 102 assigns "3" as the recommended order of the input terminal 502 and assigns "4" as the recommended order of the output terminal 505 according to the connection priority set for the input terminal 502 and the output terminal 505 such that the numbers are sequential to the recommended order that has been determined immediately preceding this incident. Thereafter, the recommended order determining unit 102 returns the recommended order to the editor unit 101.

The editor unit 101 provides the recommended order display sections $506_1$ to $506_4$ corresponding to the input terminals 502 and 504 and the output terminals 503 and 505 on the editor screen 500, and displays the recommended order acquired from the recommended order determining unit 102 therein. That is, "3" is displayed in the recommended order display section $506_1$ corresponding to the input terminal 502, "2" is displayed in the recommended order display section $506_2$ corresponding to the output terminal 503, "1" is displayed in the recommended order display section $506_3$ corresponding to the input terminal 504, and "4" is displayed in the recommended order display section 506₄ corresponding to the output terminal 505.

When the input unit 405 is operated to input a number corresponding to the recommended order or to select any of the recommended order display sections 506₁ to 506₄, the terminal corresponding to the input number or the selected one of the recommended order display sections 506₁ to 506₄ is selected as a connection target. The operation on the input unit 405 to input a number corresponding to the recommended order or to select any of the recommended order display sections 506₁ to 506₄ may vary, such as a selection of the recommended order by a keyboard or a selection by a mouse; however, it is not limited to a specific method.

The recommended order determining unit 102 may distinguish the recommended order of the terminals that cause a compilation error and the recommended order of the terminals that do not cause a compilation error and return the same to the editor unit 101, and upon displaying the recommended order in the recommended order display sections 506₁ to 506₄, the editor unit 101 may display the recommended order of the terminals that cause a compilation error and the recommended order of the terminals that do not cause a compilation error in different colors. By so doing, the terminals that cause a compilation error can be easily recognized; therefore, time required for the programming can be shortened.

According to the second embodiment, upon designating an already-arranged FBD part on the editor screen, the recommended order can be displayed such that the terminal with a higher possibility of reconnection has a higher priority. In other words, according to the second embodiment, the priority of the terminals can be easily understood upon selecting the source terminal during the connecting procedure. Due to this, the connection work can be performed efficiently.

In the above description, an example has been described of a case where the recommended order determining unit 102 detects both of matching and mismatching of the data types of the terminals of the designated FBD part and the terminals of the FBD part that has already been connected to the designated FBD part, and determines the recommended priority order of the connection work for the terminals of the designated FBD part such that the terminals with mismatching data types are numbered in accordance with the connection priority for the connection, and, sequential to the numbering, the terminals with a matching data type are numbered in accordance with the connection priority for the connection. However, it is also possible to detect only one of matching and mismatching of the data types of the terminals of the designated FBD part and the terminals of the FBD part that has already been connected to the designated FBD part and, on the basis of the result of the detection and acquired information on the connection priority for the connection, determine the recommended priority order of the connection work for the terminals of the designated FBD part.

Third Embodiment

The configuration of a programming device according to a third embodiment of the present invention is similar to that in the first embodiment. However, the part information 104 includes terminal characteristic information (hereafter denoted as terminal information) on terminals of each FBD part, and the part information managing unit 103 manages the terminal information on each FBD part. The terminal information includes information on the data type.

Figure 8:
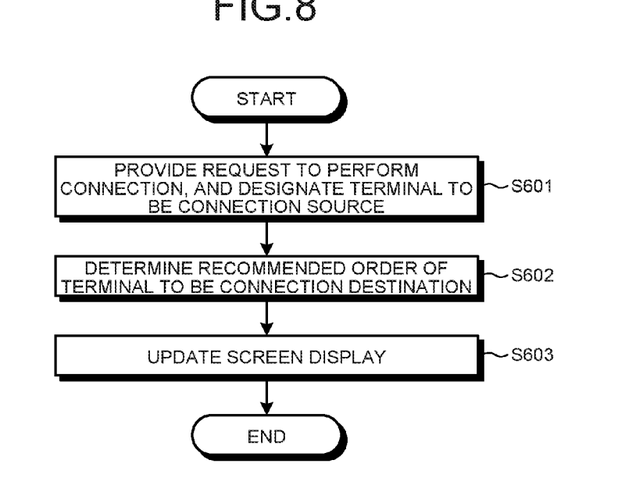
FIG. 8 is a flowchart illustrating the operation flow of a programming device according to a third embodiment.

FIG. 8 is a flowchart illustrating the operation flow of the programming device according to the third embodiment. When a program is created using FBD parts, the user operates the input unit 405 to designate a terminal of an FBD part that has already been arranged on the editor screen. Then, the user operates the input unit 405 to provide a request to connect the designated terminal to the editor unit 101 (step S601).

The editor unit 101 that has received the request to connect the designated terminal requests the recommended order determining unit 102 to extract terminals of FBD parts other than the FBD part whose terminal has been designated. The recommended order determining unit 102 requests terminal information on the FBD part whose terminal has been designated and also terminal information on other FBD parts from the part information managing unit 103. The part information managing unit 103 reads, from the part information 104, the terminal information requested by the recommended order determining unit 102 and returns the same to the recommended order determining unit 102. On the basis of the terminal information acquired from the part information managing unit 103, the recommended order determining unit 102 extracts terminals that do not cause a compilation error even if they are connected to the designated terminal and determines the recommended order according to the linear distance from the designated terminal. The linear distance herein can be calculated as the length of the line between two points on the basis of the xy coordinates of the designated terminal on the editor screen and the xy coordinates of the terminal of the FBD part that is other than the designated FBD part on the editor screen. Subsequently, the recommended order determining unit 102 extracts the remaining terminals that do not cause a compilation error upon being connected to the designated terminal and determines the recommended order according to the linear distance from the designated terminal such that the numbers are sequential to the recommended order that has been determined immediately preceding this incident (step S602).

In a case where there are plural terminals with the same linear distance from the designated terminal, the recommended order determining unit 102 determines the recommended order according to a preset rule. For example, the recommended order determining unit 102 determines the recommended order according to the rule that gives priority to a terminal positioned on the upper side or to a terminal positioned on the left side on the editor screen, or the like. As above, the recommended order in the present embodiment indicates a priority of connection with the designated terminal because the terminals that do not cause a compilation error are given lower numbers and the terminals that cause a compilation error are given the numbers sequential to the numbers given to the terminals that do not cause a compilation error.

The recommended order determining unit 102 sends the determined recommended order to the editor unit 101. The editor unit 101 provides the recommended order display sections such that they correspond to the terminals of the FBD parts other than the FBD part with the designated terminal and updates the screen display such that the recommended order determined by the recommended order determining unit 102 is displayed on the editor screen (step S603). That is, the recommended order of natural numbers starting from "1" is displayed on the editor screen.

Figure 9:
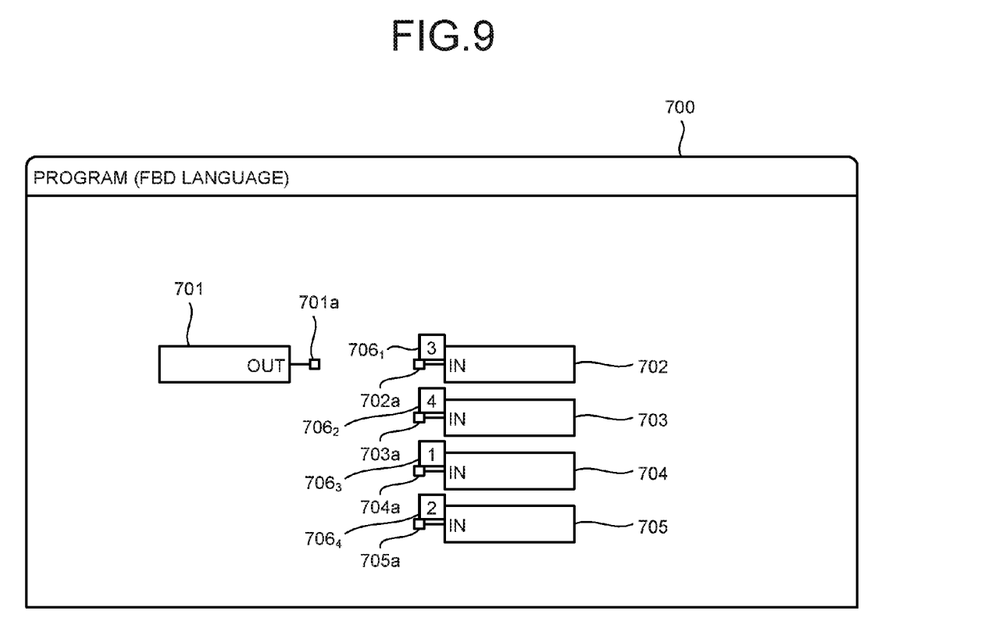
FIG. 9 is a diagram illustrating an example of an editor screen that the programming device according to the third embodiment causes a display unit to display.

An operation of the programming device of the third embodiment will be described with reference to a specific example. FIG. 9 is a diagram illustrating an example of the editor screen that the programming device according to the third embodiment causes a display unit to display. An editor screen 700 displays FBD parts 701 to 705. The FBD part 701 includes an output terminal 701a, and the FBD parts 702 to 705 include input terminals 702a to 705a. Further, the editor screen 700 displays recommended order display sections $706_1$ to $706_4$. In the recommended order display sections $706_1$ to $706_4$, the recommended order determined by the recommended order determining unit 102 is displayed.

Here, it is assumed that the data type of the output terminal 701a of the FBD part 701 is different from that of the input terminal 702a of the FBD part 702 and thus a compilation error occurs upon connection. For example, for types defined in IEC61131-3, there are data types such as INT type being an integer type, REAL type being a floating-point type, or BOOL type that indicates the result corresponding to a conditional equation by true or false. A compilation error occurs when the input terminal and the output terminal having different data types are connected. Further, it is assumed that the data type of the output terminal 701a of the FBD part 701 is different from that of the input terminal 703a of the FBD part 703 and thus a compilation error occurs upon connection. Further, it is assumed that the data type of the output terminal 701a of the FBD part 701 matches the data type of the input terminal 704a of the FBD part 704 and thus a compilation error does not occur upon connection. Moreover, it is assumed that the data type of the output terminal 701a of the FBD part 701 matches the data type of the input terminal 705a of the FBD part 705 and thus a compilation error does not occur upon connection.

An operation of determining the recommended order performed by the recommended order determining unit 102 will be described. The recommended order determining unit 102 acquires the terminal information on the FBD part 701 with the designated output terminal 701a and the FBD parts 702 to 705 from the part information 104 via the part information managing unit 103. The recommended order determining unit 102 that has acquired the terminal information first extracts the input terminal 704a and the input terminal 705a as the terminals that do not cause a compilation error in the case of connecting with the output terminal 701a that is the designated terminal. The recommended order determining unit 102 assigns "1" as the recommended order of the input terminal 704a and assigns "2" as the recommended order of the input terminal 705a, in accordance with the shortness of the linear distance from the output terminal 701a that is the designated terminal. Subsequently, the recommended order determining unit 102 extracts the input terminal 702a and the input terminal 703a as the remaining terminals that cause a compilation error in the case of connecting with the output terminal 701a that is the designated terminal. The recommended order determining unit 102 assigns "3" as the recommended order of the input terminal 702a and assigns "4" as the recommended order of the input terminal 703a, in accordance with the shortness of the linear distance from the output terminal 701a that is the designated terminal such that the numbers are sequential to the recommended order that has been determined immediately preceding this incident. Thereafter, the recommended order determining unit 102 returns the recommended order to the editor unit 101.

The editor unit 101 provides the recommended order display sections $706_1$ to $706_4$ corresponding to the input terminals 702a to 705a on the editor screen 700, and displays the recommended order acquired from the recommended order determining unit 102 therein. That is, "3" is displayed in the recommended order display section $706_1$ corresponding to the input terminal 702a, "4" is displayed in the recommended order display section $706_2$ corresponding to the input terminal 703a, "1" is displayed in the recommended order display section $706_3$ corresponding to the input terminal 704a, and "2" is displayed in the recommended order display section $706_4$ corresponding to the input terminal 705a.

When the input unit 405 is operated to input a number corresponding to the recommended order or to select any of the recommended order display sections $706_1$ to $706_4$, a terminal corresponding to the input number or the selected one of recommended order display sections $706_1$ to $706_4$ is connected to the designated output terminal 701a. The operation on the input unit 405 to input a number corresponding to the recommended order or to select any of the recommended order display sections $706_1$ to $706_4$ may vary, such as a selection of the recommended order by a keyboard or a selection by a mouse; however, it is not limited to a specific method.

The recommended order determining unit 102 may distinguish the recommended order of the terminals that cause a compilation error and the recommended order of the terminals that do not cause a compilation error and return the same to the editor unit 101, and upon displaying the recommended order in the recommended order display sections $706_1$ to $706_4$, the editor unit 101 may display the recommended order of the terminals that cause a compilation error and the recommended order of the terminals that do not cause a compilation error in different colors. By so doing, the terminals that do not cause a compilation error can be easily recognized; therefore, time required for the programming can be shortened.

In the above description, the example was presented which determines the recommended priority order of connection work with the designated terminal, where the recommended order determining unit 102 assigns numbers such that the terminals with the matching data type with the designated terminal, which are the terminals of FBD parts that are other than the FBD part with the designated terminal, are numbered in the order with the shorter linear distance from the designated terminal, and sequential to the numbering, the terminals with the mismatching data type with the designated terminal, which are the terminals of FBD parts that are other than the FBD part with the designated terminal, are numbered in the order with the shorter linear distance from the designated terminal. However, only one of the terminals with the matching data type and the terminals with the mismatching data type with the designated terminal may be detected, and the recommended priority order of connection work with the designated terminal may be determined on the basis of the detection result and information on the connection priority for the connections as acquired.

According to the third embodiment, upon designating a terminal of an already-arranged FBD part on the editor screen, the recommended order can be displayed such that the terminal that is recommended as a connection source has a higher priority. In other words, the priority of the terminals can be easily understood upon selecting the destination terminal during the connecting procedure. Due to this, the connection work can be performed efficiently.

In the above description, first to third embodiments have been described individually; however, the operations of these embodiments may be performed as one series of operation. For example, the operations of the second and third embodiments may be performed as one series of operation, so that when the FBD part already arranged on the editor screen is designated, the recommended order is displayed for the terminals that the designated part has, and when one of the terminals is designated, the recommended order can be displayed for terminals of FBD parts other than the designated FBD part.

As above, in the present invention, the FBD parts can be arranged and connected by selecting a recommended order or a recommended order displaying unit, and the unit for making this selection may vary, such as a selection of the recommended order by a keyboard or a selection of the recommended order displaying unit by a mouse, however, it is not limited to a specific method.

INDUSTRIAL APPLICABILITY

As above, the programming device according to the present invention is useful in allowing the user to easily recognize the recommended arranging positions for the FBD parts, and recommended connection terminals of the FBD parts in the programming in FBD language, and is especially suitable for reducing the occurrence of the compilation error.

REFERENCE SIGNS LIST 10 transmission path, 100 programming device, 101 editor unit, 102 recommended order determining unit, 103 part information managing unit, 104 part information, 300, 500, 700 editor screen, 301, 501 designated FBD part, 302 already-arranged FBD part, $303_1$, $303_2$, $303_3$, 506, $706_1$, $706_2$, $706_3$, $706_4$ recommended order display section, 304, 305, 306 arrangement candidate search range, 400 computer, 401 CPU, 402 RAM, 403 ROM, 404 storage unit, 405 input unit, 406 display unit, 407 programming tool software, 409 communication I/F, 502, 504, 509a, 702a, 703a, 704a, 705a input terminal, 503, 505, 507a, 508a, output terminal, 507, 508, 509, 701, 702, 703, 704, 705 FBD part.

The invention claimed is:

1. A programming device that creates a program in function block diagram (FBD) language that describes processes by connecting a plurality of FBD parts on an editor screen, the programming device comprising:
a memory configured to store computer-executable instructions; and
a processor configured to execute the stored instructions, which when executed by the processor perform the following operations:

manages size information indicating respective size of a respective FBD part;
acquires, when an operation to newly arrange an FBD part relative to an already-arranged FBD part on the editor screen is performed, size information on the already-arranged FBD part and size information on the FBD part to be newly arranged,
detects a plurality of regions where the FBD part to be newly arranged is capable of being arranged based on the acquired size information,
determines a recommended priority order of part arrangement among the plurality of regions based on positions of the detected regions; and
controls a display to display the determined recommended priority order in the detected regions on the editor screen.

2. The programming device according to claim 1, wherein the processor is further configured to detect the regions and determine the recommended priority order according to a preset algorithm.

3. The programming device according to claim 2, wherein the algorithm is set such that a region where an FBD part to be newly arranged is capable of being arranged is detected from a right side, a left side, and a lower side of the already-arranged FBD part, and determines a recommended priority order with higher priority in an order of the right side, the left side, and the lower side.

4. The programming device according to claim 1, wherein the processor is further configured to detect a region from among the plurality of regions that is located at a distance from the already-arranged FBD part and in which the FBD part to be newly arranged can be located without overlapping with the already-arranged FBD part.

5. The programming device according to claim 1, wherein the processor controls the display to display the determined recommended priority order in the editor screen such that a priority number is displayed in a respective region from among the plurality of regions.

6. The programming device according to claim 1, wherein the determining recommended priority order is displayed in each of the plurality of regions of the editor screen with a corresponding priority number and wherein said each of the plurality of regions corresponds to a location for the FBD part to be newly arranged.

* * * * *